United States Patent [19]

Beck et al.

[11] Patent Number: 4,976,901

[45] Date of Patent: Dec. 11, 1990

[54] MICROPOROUS MEMBRANES FROM ISOTACTIC POLYSTYRENE AND SYNDIOTACTIC POLYSTYRENE

[75] Inventors: Henry N. Beck, Walnut Creek; Robert D. Mahoney, Danville, both of Calif.

[73] Assignee: The Dow Chemical Company, Midland, Mich.

[21] Appl. No.: 477,363

[22] Filed: Feb. 8, 1990

Related U.S. Application Data

[62] Division of Ser. No. 380,845, Jul. 14, 1989, Pat. No. 4,927,535.

[51] Int. Cl.$^5$ ............................................. B01D 67/00
[52] U.S. Cl. .................................. 264/45.9; 264/212; 264/298
[58] Field of Search ...................... 264/41, 45.1, 46.1, 264/48, 514, 540, 556, 176.1, 212, 298, DIG. 48, DIG. 62; 210/500.1, 500.21, 500.27

[56] References Cited

U.S. PATENT DOCUMENTS

| | | |
|---|---|---|
| 2,988,783 | 6/1961 | Miller et al. . |
| 3,019,077 | 1/1962 | Carey et al. . |
| 3,046,245 | 7/1962 | Kern et al. . |
| 3,061,570 | 10/1962 | Kern et al. . |
| 3,069,406 | 1/1962 | Newman et al. . |
| 3,078,139 | 2/1963 | Brown et al. . |
| 3,092,891 | 6/1963 | Baratti . |
| 3,303,159 | 2/1967 | Saunders . |
| 3,342,920 | 9/1967 | Fukushima et al. . |
| 3,725,520 | 4/1973 | Suzuki et al. . |
| 3,896,061 | 7/1975 | Tanzawa et al. . |
| 3,903,023 | 9/1975 | Boutillier et al. . |
| 4,403,069 | 9/1983 | Keller et al. . |
| 4,539,256 | 9/1985 | Shipman . |
| 4,595,707 | 6/1986 | McCreedy et al. . |
| 4,680,353 | 7/1987 | Ishihara et al. . |
| 4,813,983 | 3/1989 | Nohmi et al. . |
| 4,859,339 | 8/1989 | Wessling et al. . |

FOREIGN PATENT DOCUMENTS

| | | |
|---|---|---|
| 1102944 | 6/1981 | Canada . |
| 55-14163 | 4/1980 | Japan . |

OTHER PUBLICATIONS

Aubert, J. H., *Polym. Prepr. (Am. Chem. Soc., Div. Polym. Chem.)*, 28(1), 147–8 (1987).
Guenet, J. M., and McKenna, G. B., *J. Polymer Sci., Part B: Polym. Phys.*, 24(11), 2499–508 (1986).
Guenet, J. M., *Macromolecules*, 19(7), 1961–8 (1986).
Guenet, J. M., *Polym. Bull. (Berlin)*, 14(1), 105–8 (1985).
Roots, J., Nystroem, B., and Higgins, J. S., *Polym. Commun.*, 26(8), 229–32 (1985).
Guenet, J. M., Wittmann, J. C., and Lotz, B., *Macromolecules*, 18(3), 420–7 (1985).
Atkins, E. D. T., Hill, M. J., Jarvis, D. A., Keller, A., Sarhene, E., and Shapiro, J. S., *Colloid Polym. Sci.*, 262(1), 22–45 (1984).
Sundararajan, P. R., Tyrer, N., and Bluhm, T., *Macromolecules*, 15(2), 286–90 (1982).
Sundararajan, P. R., Tyrer, N., and Bluhm, T., *Polym. Bull. (Berlin)*, 6(5–6), 285–9 (1982).
Atkins, E. D. T., Keller, A., Shapiro, J. S., and Lemstra, P. J., *Polymer* 22(9), 1161–4 (1981).
Painter, P. C., Kessler, R. E., and Snyder, R. W., *J. Polym. Sci., Polym. Phys. Ed.*, 18(4), 723–9 (1980).
Wellinghoff, S., Shaw, J., and Baer, E., *Macromolecules*, 12(5), 932–9 (1979).
Girolamo, M., Keller, A., Miyasaka, K., and Overbergh, N., *J. Polym. Sci., Polym. Phys. Ed.*, 14(1), 39–61 (1976).
Lemstra, P. J., and Challa, G., *J. Polym. Sci., Polym. Phys. Ed., 13(9), 1809–17 (1975)*.
Helms, J. B., and Challa, G. J., *J. Polym. Sci., Part A-2*, 10(4), 761–5 (1972).
Blais, P., and Manley, R. St. John, *J. Polym. Sic., Polym. Phys. Ed.*, 4(6), 1022–4 (1966).
Vittoria, *Makromol. Chem., Rapid Commun.* 9, 765–769 (1988).
Immirzi et al., *Makromol. Chem., Rapid Commun.* 9, 761–764 (1988).
Campbell, Tod W., and Haven, Jr., A. C., *Journal of Applied Polym. Sci.* 1(1), 73–83 (1959).

*Primary Examiner*—Frank Sever

[57] ABSTRACT

This invention relates to novel semi-permeable isotropic or anisotropic microporous membranes fabricated from a mixture of isotactic polystyrene and syndiotactic polystyrene and a method of producing such membranes.

12 Claims, No Drawings

MICROPOROUS MEMBRANES FROM ISOTACTIC POLYSTYRENE AND SYNDIOTACTIC POLYSTYRENE

CROSS-REFERENCE TO RELATED APPLICATION

This is a divisional of application Ser. No. 07/380,845, filed July 14, 1989 now U.S. Pat. No. 4,927,535.

BACKGROUND OF THE INVENTION

This invention relates to microporous membranes comprised of a mixture of isotactic polystyrene and syndiotactic polystyrene and a method of preparing such membranes.

Microporous membranes have long been used in the liquid membrane separation processes of ultrafiltration and microfiltration. Ultrafiltration and microfiltration are pressure driven filtration processes using microporous membranes in which particles or solutes are separated from solutions based on differences in particle size, particle shape, and/or molecular weight. Such microporous membranes may be isotropic or anisotropic (asymmetric). Isotropic microporous membranes possess a morphology in which the pore size within the membrane is substantially uniform throughout the membrane. Anisotropic (asymmetric) microporous membranes possess a morphology in which a pore size gradient exists across the membrane; that is, the membrane morphology varies from highly porous, larger pores at one membrane surface to less porous, smaller pores at the other membrane surface. Such anisotropic membranes thus possess a microporous "skin" of smaller pores. The term asymmetric is often used interchangeably with the term anisotropic.

In the past, such microporous membranes have been fabricated from aliphatic polyolefins such as polyethylene and polypropylene, or from high performance polymers such as sulfonated polyetheretherketone.

However, the aliphatic polyolefin polymers presently used, while inexpensive and easy to process, exhibit relatively low heat distortion temperatures. The high performance polymers, such as sulfonated polyetheretherketone, are derived from polymers which are difficult to process and quite expensive.

What is needed are isotropic and anisotropic microporous membranes useful for ultrafiltration and microfiltration which possess good solvent resistance and heat distortion temperatures, are easily processed, and are prepared from low-cost materials.

SUMMARY OF THE INVENTION

The invention is a semi-permeable membrane comprising a thin isotropic or anisotropic microporous membrane consisting essentially of a mixture of isotactic polystyrene and syndiotactic polystyrene, wherein the ratio of isotactic polystyrene to syndiotactic polystyrene is such that the membrane possesses sufficient structural integrity under conditions of operation.

In another aspect, the invention is a process for preparing a semi-permeable isotropic or anisotropic microporous membrane comprising the steps of:
A. forming a mixture comprising:
  (i) isotactic polystyrene and syndiotactic polystyrene, wherein the ratio of isotactic polystyrene to syndiotactic polystyrene is such that the membrane possesses sufficient structural integrity under conditions of operation,
  (ii) at least one solvent for the polystyrenes, and
  (iii) optionally at least one non-solvent for the polystyrenes;
B. heating the mixture to a temperature under conditions such that a homogeneous fluid is formed which possesses sufficient viscosity to be formed into a membrane;
C. extruding or casting the homogeneous fluid into a membrane;
D. quenching or coagulating the membrane by passing the membrane through one or more zones under conditions such that the membrane solidifies;
E. simultaneously or consecutively leaching the membrane by passing the membrane through one or more zones under conditions such that at least a substantial portion of the solvent and optional nonsolvent for the polystyrenes is removed from the membrane;
F. optionally heating the membrane before, during, and/or after leaching to a temperature at or above ambient temperature and below the melting point of the polystyrenes or the depressed melting point of the polystyrenes/solvent/optional non-solvent mixture, and drawing the membrane to elongate the membrane and to induce orientation of the polystyrenes in the membrane;
wherein the semi-permeable membrane so formed possesses isotropic or anisotropic microporous structure.

The semi-permeable membranes so formed are useful in ultrafiltration and microfiltration and/or as supports for composite gas or liquid separation membranes. The semi-permeable membranes of this invention possess good solvent resistance and heat distortion properties. The semi-permeable membranes may be prepared with relative ease and low cost.

DETAILED DESCRIPTION OF THE INVENTION

The membranes of this invention are prepared from a mixture of syndiotactic and isotactic polystyrene. Polystyrene is represented by the formula:

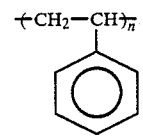

in which the phenyl group is pendent to the polymer backbone. Polystyrene may be isotactic, syndiotactic, or atactic, depending upon the positional relationship of the phenyl groups to the polymer backbone. Syndiotactic polystyrene is polystyrene wherein the phenyl groups which are pendent from the polymer backbone alternate with respect to which side of the polymer backbone the phenyl group is pendent. In other words, every other phenyl group is on the same side of the polymer backbone. Isotactic polystyrene has all of the phenyl groups on the same side of the polymer backbone. Standard polystyrene is referred to as atactic, meaning it has no stereoregularity; the placement of the phenyl groups with respect to each side of the polymer backbone is random, irregular, and follows no pattern. For further definition and description of stereoregular polymers, see Leo Mandelkern, *An Introduction to Macromolecules,* 2nd edition, Springer-Verlag, New York, N.Y., 1983, pp. 49–51, the relevant portions incorporated herein by reference.

Isotactic and syndiotactic polystyrene may be prepared by methods well known in the art. For procedures for the preparation of isotactic polystyrene, see Natta et al., *Makromol. Chem.*, Vol. 28, p. 253 (1958), the relevant portions incorporated herein by reference. For procedures for the preparation of syndiotactic polystyrene, see Japanese Patent No. 104818 (1987); Ishihara et al., U.S. Pat. No. 4,680,353: and Ishihara, *Macromolecules*, 19 (9), 2464 (1986); the relevant portions incorporated herein by reference. The polystyrenes of this invention may optionally contain small amounts of inert compounds, inhibitors, stabilizers, or other additives which do not adversely affect the membrane-forming ability of the polystyrene/solvent/optional non-solvent mixture. Preferably the presence of these minor impurities in the polystyrenes is less than about 10 weight percent, more preferably less than about 5 weight percent, most preferably less than about 1 weight percent.

The properties of the polystyrene vary according to the tacticity of the polystyrene, that is, the positional relationship of the pendent phenyl groups to the polymer back-bone. Atactic polystyrene is generally unsuitable for membrane formation because of its lack of crystallinity and poor solvent resistance. Isotactic polystyrene possesses improved solvent and temperature resistance over atactic polystyrene. However, isotactic polystyrene is somewhat slow to produce suitable gels from its solutions at ambient conditions necessary to form membranes. Isotactic polystyrene crystallizes very slowly to form crystalline species that melt at about 190° to about 240° C.; nucleating agents often must be added to facilitate its crystallization. Syndiotactic polystyrene exhibits excellent heat distortion temperature properties. Syndiotactic polystyrene rapidly crystallizes to form crystalline species that melt at about 269° to about 276° C.; nucleating agents are generally not needed to facilitate its crystallization. Syndiotactic polystyrene solutions also tend to gel rapidly at reduced temperatures. The solvent resistance, heat distortion temperature, and gel formation abilities of polystyrene can thus be controlled to advantage by employing a mixture of isotactic polystyrene and syndiotactic polystyrene.

The invention comprises a semi-permeable isotropic or anisotropic microporous membrane fabricated from a mixture of isotactic polystyrene and syndiotactic polystyrene, wherein the ratio of isotactic polystyrene to syndiotactic polystyrene is such that the membrane possesses sufficient structural integrity under conditions of operation. The ratio of isotactic polystyrene to syndiotactic polystyrene is preferably between about 0.05 to about 20, more preferably between about 0.1 to about 10.

Solvents dissolve at the membrane fabrication temperature at least about 5 weight percent of the polystyrenes, preferably at least about 10 weight percent, more preferably at least about 25 weight percent, even more preferably at least about 50 weight percent. The boiling points of the solvents useful in this invention are preferably above the membrane fabrication temperature so that a significant portion of the solvent is not flashed off during the extrusion or casting step but instead is retained within the membrane until the quenching-/coagulating and/or leaching steps. The solvents preferably possess a boiling point of at least about 130° C., more preferably of at least about 140° C. The solvents useful in this invention may be protic or aprotic. A protic solvent as used herein refers to a solvent which is capable of dissolving the polystyrene in which one of the steps of dissolution involves the generation of protons or hydrogen ions. An aprotic solvent as used herein refers to a solvent which is capable of dissolving the polystyrene in which one of the steps of dissolution does not involve the generation of protons or hydrogen ions.

Solvents useful in this invention are those compounds which are a liquid at membrane fabrication temperatures and which dissolve a sufficient amount of the polystyrenes to result in a solution possessing a viscosity suitable for membrane fabrication. Solvents which are preferred on the basis of solubility include substituted benzenes of the formulas:

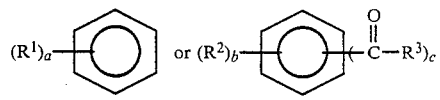

wherein
R$^1$ is hydrogen, alkyl, cycloalkyl, halo, or nitro;
R$^2$ is alkyl;
R$^3$ is alkyl, aryl, carboxyaryl, or alkoxy;
a is an integer of from 1 to 3;
b is an integer of from 0 to 3; and
c is an integer of from 1 to 2.

Other preferred solvents include alkyl, cycloalkyl, aryl, or aralkyl substituted pyrrolidinones; chloronaphthalenes; hydrogenated and partially hydrogenated naphthalenes; aryl substituted phenols; ethers of the formula:

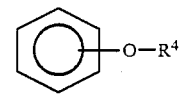

wherein R$^4$ is alkyl, cycloalkyl, or aryl; diphenyl sulfone; benzyl alcohol; caprolactam; caprolactone; alkyl aliphatic esters containing a total of from 7 to 20 carbon atoms; alkyl aryl substituted formamides; dicyclohexyl; terphenyls; partially hydrogenated terphenyls; and mixtures of terphenyls and quaterphenyls.

Preferred substituted benzene solvents include o-dichlorobenzene, 1,2,3-trichlorobenzene, 1,2,4-trichlorobenzene, xylene, nitrobenzene, acetophenone, methyl benzoate, ethyl benzoate, diphenyl phthalate, benzil, methyl salicylate, benzophenone, cyclohexyl benzene, n-butylbenzene, n-propylbenzene, phenol, and dimethyl phthalate. Examples of preferred ethers include phenetole (phenyl ethyl ether), diphenyl ether, and anisole. Examples of preferred pyrrolidinone solvents include 1-benzyl-2-pyrrolidinone, 1-cyclohexyl-2-pyrrolidinone, 1-ethyl-2-pyrrolidinone, 1-methyl-2-pyrrolidinone, and 1-phenyl-2-pyrrolidinone. More preferred pyrrolidinone solvents include the alkyl and cycloalkyl substituted pyrrolidinones. Even more preferred pyrrolidinone solvents include 1-cyclohexyl-2-pyrrolidinone, 1-ethyl-2-pyrrolidinone, and 1-methyl-2-pyrrolidinone. Preferred ether solvents include anisole and diphenyl ether. Preferred hydrogenated naphthalene solvents include decahydronaphthalene (decalin) and tetrahydronaphthalene (tetralin). Examples of terphenyls and partially hydrogenated terphenyls preferred include partially hydrogenated terphenyls, available from Monsanto under the tradename Therminol ® 66; mixed terphenyls and quaterphenyls, available from Monsanto under the tradename Therminol ® 75: and mixed terphenyls available from Monsanto under the Santowax ® R tradename. More preferred aliphatic esters are those methyl aliphatic esters with a total of from 10 to 14 carbon atoms, with methyl laurate being most preferred.

More preferred solvents include 1,2,3-trichlorobenzene, 1,2,4-trichlorobenzene, 1-ethyl-2-pyrrolidinone, 1-methyl-2-pyrrolidinone, 1-cyclohexyl-2-pyrrolidinone, acetophenone, anisole, benzil, benzophenone, benzyl alcohol, caprolactam, caprolactone, decahydronaphthalene, tetrahydronaphthalene, diphenyl ether, ethyl benzoate, methyl salicylate, dichlorobenzene, mixed terphenyls, and partially hydrogenated terphenyls.

Water miscible solvents are a preferred class of solvents which include 1-cyclohexyl-2-pyrrolidinone, 1-methyl-2-pyrrolidinone, caprolactam, caprolactone, N,N-diphenylformamide, and sulfolane.

Alkali miscible solvents are another preferred class of solvents which include alcohols and phenols.

Protic solvents preferred for use in this invention include 4-phenylphenol, benzyl alcohol, dimethyl phthalate, caprolactam, phenetole, and phenol.

Aprotic solvents preferred for use in this invention include o-dichlorobenzene, 1,2,3-trichlorobenzene, 1,2,4-trichlorobenzene, xylene, nitrobenzene, acetophenone, methyl benzoate, diphenyl phthalate, benzil, methyl salicylate, benzophenone, cyclohexyl benzene, n-butylbenzene, n-propylbenzene, 1-benzyl-2-pyrrolidinone, 1-cyclohexyl-2-pyrrolidinone, 1-ethyl-2-pyrrolidinone, 1-methyl-2-pyrrolidinone, 1-phenyl-2-pyrrolidinone, decahydronaphthalene, (decalin), tetrahydronaphthalene (tetralin), caprolactone, and methyl laurate.

The solvents useful in this invention may optionally contain small amounts of inert compounds, inhibitors, stabilizers, or other additives which do not adversely affect the membrane-forming ability of the polystyrene/solvent/optional non-solvent mixture. Preferably the presence of these minor impurities in the solvent is less than about 10 weight percent, more preferably less than about 5 weight percent, most preferably less than about 1 weight percent.

The optional non-solvents useful in this invention are those compounds which are a liquid at membrane fabrication temperatures and which dissolve less than about 5 weight percent of the polystyrenes at the membrane fabrication temperature. The boiling points of the non-solvents useful in this invention are preferably above the membrane fabrication temperature. The boiling points of the non-solvents useful in this invention are preferably above the membrane fabrication temperature so that a significant portion of the non-solvent is not flashed off during the extrusion or casting step but is retained in the membrane until the quenching/coagulating and/or leaching steps. The non-solvents preferably possess a boiling point of at least about 100° C., more preferably of at least about 120° C.

Non-solvents preferred for use in this invention include dimethylsulfoxide, ethylene carbonate, methyl caproate, methyl caprylate, methyl enanthate, methyl valerate, mineral oil, and paraffin oil.

The non-solvents useful in this invention may optionally contain small amounts of inert compounds, inhibitors, stabilizers, or other additives which do not adversely affect the membrane-forming ability of the polystyrene/solvent/optional non-solvent mixture. Preferably the presence of these minor impurities in the non-solvent is less than about 10 weight percent, more preferably less than about 5 weight percent, most preferably less than about 1 weight percent.

The concentration of the polystyrenes in the casting or extrusion mixture may vary. The concentration of the polystyrenes in the mixture is dependent upon the solvent and optional non-solvent, the molecular weight of the polystyrenes, and the viscosity of the mixture. The polystyrenes molecular weight should be sufficient such that membranes with reasonable physical integrity can be formed. The weight-average molecular weight (Mw) of the polystyrenes is preferably at least about 200,000 daltons, more preferably at least about 400,000 daltons. The preferred upper limit on the weight-average molecular weight is about 5,000,000 daltons, with about 3,000,000 daltons being more preferred. The mixture must possess sufficient viscosity to enable casting or extruding the mixture into a membrane. If the viscosity is too low, the membranes will lack physical integrity: if the viscosity is too high, the mixture cannot be formed into membranes. Preferably, the lower limit on viscosity at the membrane casting or extrusion step is about 20 poise, more preferably about 40 poise. The upper limit on viscosity at the membrane casting or extrusion step is preferably about 1,000,000 poise, more preferably about 500,000 poise, most preferably about 100,000 poise. Preferably, the mixture contains between about 5 and about 90 weight percent polystyrenes, more preferably between about 10 and about 80 weight percent polystyrenes. The amount of optional non-solvent used in the mixture is such that the solvent and non-solvent together dissolve at least about 5 weight percent, preferably at least about 10 weight percent, more preferably at least about 25 weight percent of the polystyrenes present at the membrane fabrication temperature. Preferably the amount of optional non-solvent in the mixture is less than about 20 weight percent, more preferably less than about 15 weight percent.

The membranes of this invention may be prepared by solution casting or extrusion. In the solution casting process, the polystyrenes are contacted with at least one solvent and optionally at least one non-solvent for the polystyrenes at elevated temperatures. The elevated temperature at which the mixture is contacted is that temperature at which the mixture is a homogeneous fluid, and below that temperature at which the polystyrenes degrade and below that temperature at which the solvent and optional non-solvent boils. The upper temperature limit is preferably below about 325° C., more preferably below about 300° C. The minimum temperature limit is preferably at least about 25° C. The contacting takes place with adequate mixing or agitation to ensure a homogeneous solution.

In the case of casting, a membrane may be cast into flat sheet form by pouring the mixture onto a smooth support surface and drawing down the mixture to an appropriate thickness with a suitable tool such as a doctor blade or casting bar. Alternately, the mixture may be cast in a continuous process by casting the blend onto endless belts or rotating drums. The casting surface may be such that the membrane may thereafter be readily separated from the surface. For example, the membrane may be cast onto a support having a low surface energy, such as silicone, coated glass, Teflon, or metal, or a surface to which the membrane will not adhere. The mixture may also be cast onto the surface of a liquid with which the polystyrenes are immiscible, such as water or mercury. Alternately, the mixture may be cast onto a support surface which may thereafter be dissolved away from the finished membrane. The membrane may optionally be cast into a porous support. The cast membrane is thereafter subsequently quenched or coagulated, leached, cooled, and optionally drawn as described hereinafter for microporous membranes formed by the extrusion process.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer or a resin kettle. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The mixture of polystyrenes, solvent, and optional non-solvent is heated to a temperature at which the mixture becomes a homogeneous fluid. The homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the polystyrenes such as water. The core fluid may or may not be a solvent for the extrusion solvent and optional non-solvent, depending upon whether coagulation and asymmetry is desired.

Following casting or extruding, the membrane is passed through at least one quench or coagulation zone under conditions such that the membrane solidifies. The environment of the quench or coagulation zone may be a gas, a liquid, or a combination thereof. Within the quench or coagulation zone, the membrane is subjected to cooling and/or coagulation to cause gelation and solidification of the membrane. In one preferred embodiment, the membranes are first quenched in a gas, preferably air. Within the gas quench zone, the membranes gel and solidify. A portion of the solvent and optional non-solvent may evaporate and the membrane pore structure may begin to form. The temperature of the gas quench zone is such that the membrane gels and solidifies at a reasonable rate. The temperature of the gas quench zone is preferably at least about 0° C., more preferably at least about 15° C. The temperature of the gas quench zone is preferably less than about 100° C., more preferably less than about 50° C. Ambient temperatures are particularly convenient and suitable for the gas quench zone. Shrouds may be used to help control gas flow rates and temperatures in the gas quench zone. The residence time in the gas quench zone is such that the membrane gels and solidifies. The residence time in the gas quench zone is preferably at least about 0.01 seconds, more preferably at least about 0.05 seconds. The residence time in the gas quench zone is preferably less than about 10 seconds, more preferably less than about 8 seconds.

Following or instead of the gas quench, the membranes may be quenched or coagulated in a liquid which does not dissolve the polystyrenes. The primary function of the quench or coagulation liquid may be to provide a sufficient heat transfer media to solidify the membrane. However, the quench or coagulation liquid may optionally also be a solvent for the polystyrene solvent and optional non-solvent so as to enable removal of at least a portion of the polystyrene solvent and optional non-solvent from the membrane during the quenching and/or coagulation step. Preferred liquid quench or coagulation zone materials include water, lower alcohols, halogenated hydrocarbons, and perhalogenated carbon compounds. Perhalogenated carbon compounds are materials with a carbon backbone wherein all of the hydrogen atoms have been replaced by halogen atoms. More preferred liquid quench or coagulation materials include water, chlorinated hydrocarbons, and lower alcohols, with lower alcohols being most preferred. Preferred lower alcohols are $C_{1-4}$ alcohols. The lower temperature limit on the liquid quench or coagulation zone is that temperature at which the liquid material freezes. The lower temperature limit on the liquid quench or coagulation zone is preferably at least about 0° C. The upper temperature limit on the liquid quench or coagulation zone is either the boiling point of the polystyrene solvent and/or optional non-solvent or that temperature above which the membrane does not undergo solidification when in contact with the liquid material, whichever is lower. The upper temperature limit on the liquid quench or coagulation zone is preferably less than about 100° C., more preferably less than about 50° C. Ambient temperatures are suitable and convenient. The residence time in the liquid quench or coagulation zone is such that the membrane gels and solidifies. The residence time in the liquid quench or coagulation zone is preferably at least about 0.01 seconds, more preferably at least about 0.05 seconds. The residence time in the liquid quench or coagulation zone is preferably less than about 200 seconds, more preferably less than about 100 seconds.

Following quenching and/or coagulation, the membrane is passed through at least one leach zone under conditions such that at least a substantial portion of the solvent and optional for the polystyrenes is removed from the membrane. The leach zone material is a solvent for the polystyrene solvent and optional non-solvent but does not dissolve the polystyrenes. The materials which may be used in the leach zone are the same as the materials which may be used in the liquid quench or coagulation zone. The minimum temperature of the leach zone is that temperature at which the polystyrene solvent and optional non-solvent is removed from the membrane at a reasonable rate. The minimum temperature of the leach zone is preferably at least about 0° C., more preferably at least about 15° C. The maximum temperature of the leach zone is below that temperature at which membrane integrity is adversely affected. The maximum temperature of the leach zone is preferably less than about 150° C., more preferably less than about 100° C. The residence time in the leach zone is that which is sufficient to remove at least a portion of the polystyrene solvent and optional non-solvent from the membrane. Preferably, a substantial portion of the remaining polystyrene solvent and optional non-solvent is removed from the membrane in the leach zone. The residence time in the leach zone is preferably between about 1 second and about 24 hours, more preferably between about 30 seconds and about 8 hours. The leach step may be performed as a continuous or batch process. The residence time is dependent upon the particular solvent and non-solvent, the membrane size and thickness, and the kinetics for removing the solvent and optional non-solvent from the membrane.

The semi-permeable microporous membrane thus formed may be isotropic or anisotropic. With respect to anisotropic hollow fiber microporous membranes, the skin may be on the inside or the outside of the hollow fibers.

Before, during, and/or after leaching, the membranes may be drawn down or elongated to the appropriate size and thickness. Drawing down or elongating means the membranes are stretched such that the length of the membrane is longer and the diameter smaller at the end of the drawing or elongation process. Drawing increases the mechanical strength of the membrane by inducing orientation in the membrane. The draw temperature is dependent upon whether the membrane contains solvent and optional non-solvent at the time of drawing. For substantially solvent and optional non-solvent free membranes, the membrane is heated to a temperature between the polystyrenes glass transition temperature and the polystyrenes melting point, with preferred upper temperatures being less than about 280° C., more preferably less than about 270° C. and with preferred lower temperatures being at least about 90° C., more preferably at least about 100° C. For membranes containing solvent and optional non-solvent, the membrane is heated to a temperature between ambient temperature and the melting point of the polystyrenes or the depressed melting point of the polystyrenes/solvent/optional non-solvent mixture, preferred upper temperatures being less than about 10° C. below the depressed melting point; and preferred lower temperatures being at least about 10° C., more preferably at least about 25° C. The membrane is drawn by stretching the membrane under tension. Flat sheet membranes may be uniaxially or biaxially drawn, while hollow fiber membranes are uniaxially drawn. Drawing is generally performed by running the membranes over a pair of godets in which the latter godets are moving at a faster rate than the former godets. The draw down or elongation ratio is the ratio of the beginning length of the membrane to the final length of the membrane. Preferably the lower limit on the draw down or elongation ratio is about 1.05, more preferably 1.1. Preferably the upper limit on the draw down or elongation ratio is about 10. The membranes may be drawn in one or more stages with the options of using different temperatures, draw rates, and draw ratios in each stage. The membranes are drawn down or elongated using godet rollers or other conventional equipment to the appropriate size and thickness. Line speeds are generally not critical and may vary significantly. Practical minimum preferred line speeds are at least about 10 feet/minute, more preferably at least about 30 feet/minute. Maximum preferred line speeds are less than about 2000 feet/minute, more preferably less than about 1000 feet/minute.

The transport rate through the membrane for an isotropic membrane is inversely proportional to the membrane thickness, while the transport rate through the membrane for an anisotropic membrane is controlled by the resistance to transport created by the anisotropic character of the membrane. The thickness of the membrane is such that the membrane possesses adequate mechanical strength under use conditions and good separation characteristics. In the case of flat sheet membranes, the minimum thickness is preferably at least about 10 microns, more preferably at least about 15 microns. The maximum thickness for flat sheet isotropic membranes is preferably less than about 500 microns, more preferably less than about 400 microns; the maximum thickness for flat sheet anisotropic membranes is preferably less than about 1000 microns. In the case of hollow fibers, the outer diameter of the membrane is preferably at least about 50 microns, more preferably at least about 70 microns; the outer diameter of the membrane is preferably less than about 5000 microns, more preferably less than about 4000 microns. The inside diameter of the hollow fiber membranes is preferably at least about 30 microns, more preferably at least about 40 microns; the inside diameter of the hollow fiber membranes is preferably less than about 4980 microns, more preferably less than about 3980 microns. The hollow fiber membrane thickness is preferably at least about 10 microns, more preferably at least about 15 microns; the membrane thickness for isotropic membranes is preferably less than about 500 microns, more preferably less than about 400 microns; the membrane thickness for anisotropic membranes is preferably less than about 1000 microns.

The final solvent and optional non-solvent free membranes preferably exhibit a glass transition temperature of at least about 80° C., more preferably of at least about 90° C., most preferably of at least about 100° C.

The membranes are fabricated into flat sheet, spiral, tubular, or hollow fiber devices by methods described in the art. Spiral wound, tubular, and hollow fiber devices are preferred. Tubesheets may be affixed to the membranes by techniques known in the art. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

The membranes are useful in ultrafiltration and microfiltration. Ultrafiltration and microfiltration are pressure driven filtration processes using isotropic or anisotropic microporous membranes in which particles or solutes are separated from solutions based on differences in particle size, particle shape, and/or molecular weight.

The membranes are used to recover or isolate solutes or particles from solutions. The membrane divides the separation chamber into two regions, a high pressure side into which the feed solution is introduced and a low pressure side. One side of the membrane is contacted with the feed solution under pressure, while a pressure differential is maintained across the membrane. To be useful, at least one of the particles or solutes of the solution is selectively retained on the high pressure side of the membrane while the remainder of the solution selectively passes through the membrane. Thus the membrane selectively "rejects" at least one of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

The separation process should be carried out at pressures which do not adversely affect the membrane, that is, pressures which do not cause the membrane to mechanically fail. The pressure differential across the membrane is dependent upon the membrane characteristics, including pore size, porosity, the thickness of the membrane, and in the case of hollow fiber membranes, the inside diameter. For the membranes of this invention, the pressure differential across the membrane is preferably between about 5 and about 500 psig, more preferably between about 10 and about 300 psig. The separation process should be carried out at temperatures which do not adversely affect membrane integrity. Under continuous operation, the operating temperature is preferably between about 0° and about 150° C., more preferably between about 15° and about 130° C.

Ultrafiltration and microfiltration membranes may be characterized in a variety of ways, including porosity, mean pore size, maximum pore size, bubble point, gas flux, water flux, and molecular weight cut off. Such techniques are well known in the art for characterizing microporous membranes. See Robert Kesting, *Synthetic Polymer Membranes*, 2nd edition, John Wiley & Sons, New York, N.Y., 1985, pp. 43-64: Channing R. Robertson (Stanford University), *Molecular and Macromolecular Sieving by Asymmetric Ultrafiltration Membranes*, OWRT Report, NTIS No. PB85-1577661EAR, September 1984: and ASTM Test Methods F316-86 and F317-72 (1982): the relevant portions incorporated herein by reference.

Porosity refers to the volumetric void volume of the membrane. Porosity may be determined gravimetrically from the density of the void-free polymer or from the differences between the wet and dry weights of the membrane. The membranes of this invention preferably have a porosity of at least about 5 percent, more preferably at least about 10 percent; the membranes of this invention preferably have a porosity of less than about 90 percent, more preferably of less than about 80 percent.

Pore size of the membrane may be estimated by several techniques including scanning electron microscopy, and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation $$r = \frac{2G}{P}$$

where
r is the pore radius
G is the surface tension (water/air), and
P is the pressure.

See ASTM F316-86, the relevant portions incorporated herein by reference.

The membranes of this invention useful for ultrafiltration preferably possess a maximum pore size which exhibits a bubble point with denatured alcohol in the range of about 90-100 psig or greater, more preferably in the range of about 180-190 psig or greater.

The mean pore size of the membranes of this invention useful for ultrafiltration is preferably between about 5 and about 1000 Angstroms, more preferably between about 10 and about 500 Angstroms; the maximum pore size of such membranes is preferably less than about 1000 Angstroms, more preferably less than about 800 Angstroms. The mean pore size of the membranes of this invention useful for microfiltration is preferably between about 0.02 and about 10 microns, more preferably between about 0.05 and about 5 microns; the maximum pore size of such membranes is preferably less than about 10 microns, more preferably less than about 8 microns.

Gas flux is defined as $$F = \frac{\text{(amount of gas passing through the membrane)}}{\text{(membrane area)(time)} \text{(driving force across the membrane)}}$$

A standard gas flux unit is $$\frac{\text{(centimeter)}^3 \text{(STP)}}{\text{(centimeter)}^2 \text{(second)(centimer Hg)}},$$

abbreviated hereinafter as $$\frac{cm^3 \text{ (STP)}}{cm^2 \text{ sec cm Hg}}$$

where STP stands for standard temperature and pressure. The membranes of this invention preferably have a gas flux for nitrogen of at least about $$1 \times 10^{-6} \frac{cm^3 \text{ (STP)}}{cm^2 \text{ sec cm Hg}},$$

more preferably of at least about $$1 \times 10^{-4} \frac{cm^3 \text{ (STP)}}{cm^2 \text{ sec cm Hg}}.$$

Water flux is defined as $$W = \frac{\text{(amount of water passing through the membrane)}}{\text{(membrane area)(time)}}$$

under given conditions of temperature and pressure. The water flux is commonly expressed in gallons per square foot of membrane area per day (GFD). The membranes of this invention preferably exhibit a water flux at about 25° C. and about 50 psig of at least about 1 GFD, more preferably of at least about 10 GFD.

SPECIFIC EMBODIMENTS

The following Examples are included for illustrative purposes only and are not intended to limit the scope of the invention or claims. All percentages are by weight unless otherwise indicated.

EXAMPLE 1

Mixtures consisting of approximately five weight percent polymer in various organic compounds are prepared in two dram-capacity glass vials that are subsequently sealed with aluminum foil liners. The mixtures are weighed to a precision of one milligram. The vials are placed in an air-circulating oven at about 125°–140° C. Dissolution behavior is observed by transmitted light at close range from an AO universal microscope illuminator at progressively increasing temperatures until complete dissolution is observed, until the boiling point of the solvent is closely approached, or until 300° C. is reached (the approximate ceiling temperature of the polystyrene). The temperature is increased in about 25° C. increments. The mixtures are allowed to remain at a given temperature for at least about 30 minutes before the temperature is increased further. The hot mixtures are cooled to room temperature; their appearance is noted after they are allowed to stand undisturbed overnight at room temperature. The results are compiled in Table I. The polymer noted as "IPS42" refers to a sample of isotactic polystyrene with a viscosity average molecular weight in excess of $2.6 \times 10^6$ daltons and contains about 9.4% atactic polystyrene (i.e. polymer extractable with hot methyl ethyl ketone). The polymer noted as "SYNDIO2" is a sample of syndiotactic polystyrene with a weight-average molecular weight of about $5.6 \times 10^5$ daltons. The polymer noted as "SYNDIO" is a sample of syndiotactic polystyrene with a lower molecular weight.

TABLE I

| POLYMER | CONC. WGT. % | ISOLVENT | APPROX. B.P., DEG. C. | TEMP. DEG. C. | SOLUBILITY | APPEARANCE AT ROOM TEMP. |
|---|---|---|---|---|---|---|
| IPS42 | 5.01 | 1,2,3-trichlorobenzene | 218 | 191 | Soluble | Hard opaque solid |
| IPS42 | 5.08 | 1,2,4-trichlorobenzene | 214 | 190 | Partly soluble | |
| IPS42 | 5.08 | 1,2,4-trichlorobenzene | 214 | 202 | Soluble | Clear liquid |
| IPS42 | 5.14 | 1-benzyl-2-pyrrolidinone | 420 | 275 | Soluble | Amber clear viscous fluid |
| IPS42 | 5.14 | 1-benzyl-2-pyrrolidinone | 420 | 250 | Partly soluble | |
| IPS42 | 5.83 | 1-chloronaphthalene | 258 | 225 | Partly soluble | |
| IPS42 | 5.83 | 1-chloronaphthalene | 258 | 250 | Soluble | Clear moderately viscous fluid |
| IPS42 | 5.24 | 1-cyclohexyl-2-pyrrolidinone | 301 | 200 | Partly soluble | |
| IPS42 | 5.24 | 1-cyclohexyl-2-pyrrolidinone | 301 | 224 | Soluble | Amber clear thin jelly |
| IPS42 | 5.21 | 1-ethyl-2-pyrrolidinone | 206 | 141 | Swollen gel | |
| IPS42 | 5.21 | 1-ethyl-2-pyrrolidinone | 206 | 190 | Soluble | Yellow clear viscous fluid |
| IPS42 | 5.02 | 1-methyl-2-pyrrolidinone | 202 | 190 | Partly soluble | |
| IPS42 | 5.02 | 1-methyl-2-pyrrolidinone | 202 | 202 | Soluble | Yellow clear viscous fluid |
| IPS42 | 5.09 | 1-phenyl-2-pyrrolidinone | 345 | 250 | Mostly soluble | |
| IPS42 | 5.09 | 1-phenyl-2-pyrrolidinone | 345 | 274 | Soluble | Brown hard solid |
| IPS42 | 25.29 | 4-phenylphenol | 321 | 231 | Soluble | Opaque solid |
| IPS42 | 5.09 | 4-phenylphenol | 321 | 200 | Soluble | Tan opaque hard solid |
| IPS42 | 5.18 | acetophenone | 202 | 202 | Soluble | Clear liquid |
| IPS42 | 5.18 | acetophenone | 202 | 190 | Partly soluble | |
| IPS42 | 5.21 | anisole | 154 | 154 | Soluble | Clear viscous fluid |
| IPS42 | 5.19 | benzil | 347 | 200 | Soluble | Clear yellow viscous fluid |
| IPS42 | 5.19 | benzil | 347 | 150 | Partially soluble | |
| IPS42 | 5.08 | benzophenone | 305 | 202 | Soluble | Clear yellow moderately viscous fluid |
| IPS42 | 5.08 | benzophenone | 305 | 190 | Partly soluble | |
| IPS42 | 5.42 | benzyl alcohol | 205 | 190 | Almost soluble | |
| IPS42 | 5.42 | benzyl alcohol | 205 | 204 | Soluble | Cloudy firm gel |
| IPS42 | 4.97 | butyl stearate | 343 | 275 | Partly soluble | |
| IPS42 | 4.97 | butyl stearate | 343 | 299 | Hazy & soluble?? | Opaque non-homogeneous semisolid |
| IPS42 | 5.09 | caprolactam (epsilon) | 271 | 211 | Soluble | Opaque hard solid |
| IPS42 | 25.12 | caprolactam (epsilon) | 271 | 231 | Soluble | |
| IPS42 | 4.96 | decahydronaphthalene (decalin) | 190 | 190 | Soluble | Hazy liquid with bottom gel layer |
| IPS42 | 5.19 | dimethyl phthalate | 282 | 190 | Soluble | Clear liquid |
| IPS42 | 4.95 | dioctyl pthalate | 384 | 209 | Badly swollen | |
| IPS42 | 4.95 | dioctyl pthalate | 384 | 298 | Hazy & soluble?? | Hazy stiff gel |
| IPS42 | 5.31 | diphenyl ether | 259 | 190 | Partly soluble | |
| IPS42 | 5.31 | diphenyl ether | 259 | 202 | Soluble | Clear moderately viscous fluid |
| IPS42 | 5.19 | diphenyl sulfone | 379 | 166 | Almost soluble | |
| IPS42 | 5.19 | diphenyl sulfone | 379 | 200 | Soluble | Light tan opaque hard solid |
| IPS42 | 5.01 | ethyl benzoate | 212 | 202 | Soluble | Clear moderately viscous fluid |
| IPS42 | 5.01 | ethyl benzoate | 212 | 190 | Partly soluble | |
| IPS42 | 5.10 | HB-40 (Monsanto) | 325 | 250 | Soluble | Yellow clear viscous fluid |
| IPS42 | 5.10 | HB-40 (Monsanto) | 325 | 225 | Partly soluble | |
| IPS42 | 5.05 | mesitylene (1,3,5-trimethyl-benzene) | 163 | 161 | Almost soluble | Hazy viscous gelatinous fluid |
| IPS42 | 5.25 | methyl benzoate | 199 | 190 | Partly soluble | |
| IPS42 | 5.25 | methyl benzoate | 199 | 202 | Soluble | Clear liquid |
| IPS42 | 5.08 | methyl laurate | 262 | 202 | Almost soluble | |
| IPS42 | 5.08 | methyl laurate | 262 | 225 | Soluble | Cloudy rigid gel |
| IPS42 | 5.05 | methyl salicylate | 222 | 190 | Partly soluble | |
| IPS42 | 5.05 | methyl salicylate | 222 | 202 | Soluble | Hazy moderately viscous fluid |
| IPS42 | 5.01 | methyl myristate | 323 | 298 | Hazy & soluble?? | White opaque stiff gel |
| IPS42 | 5.01 | methyl myristate | 323 | 209 | Almost soluble | |
| IPS42 | 5.09 | methyl stearate | 359 | 249 | Mostly soluble | |
| IPS42 | 5.09 | methyl stearate | 359 | 299 | Hazy & soluble?? | Pale yellow hard solid |
| IPS42 | 5.09 | methyl stearate | 359 | 275 | Hazy & soluble?? | |

TABLE I-continued

| POLYMER | CONC. WGT. % | ISOLVENT | APPROX. B.P., DEG. C. | TEMP. DEG. C. | SOLUBILITY | APPEARANCE AT ROOM TEMP. |
|---|---|---|---|---|---|---|
| IPS42 | 5.07 | nitrobenzene | 211 | 202 | Partly soluble | Yellow clear moderately viscous fluid |
| IPS42 | 5.14 | N,N-dimethylacetamide | 165 | 166 | Soluble | Clear fluid with white ppt. |
| IPS42 | 5.14 | N,N-dimethylacetamide | 165 | 151 | Almost soluble | |
| IPS42 | 5.08 | N,N-dimethylformamide | 153 | 151 | Almost soluble | White opaque slush |
| IPS42 | 5.04 | N,N-diphenylformamide | 337 | 249 | Soluble | Light brown solid |
| IPS42 | 5.04 | N,N-diphenylformamide | 337 | 225 | Gelatinous | |
| IPS42 | 5.16 | octyl acetate | 211 | 189 | Almost soluble | |
| IPS42 | 5.16 | octyl acetate | 211 | 209 | Hazy & soluble?? | Milky suspension |
| IPS42 | 9.86 | o-dichlorobenzene | 180 | 179 | Soluble | Clear fluid |
| IPS42 | 5.04 | Santowax R (Monsanto) | 364 | 166 | Gelatinous | |
| IPS42 | 5.04 | Santowax R (Monsanto) | 364 | 200 | Soluble | Tan hard solid |
| IPS42 | 24.89 | sulfolane | 285 | 241 | Soluble | Soft opaque solid |
| IPS42 | 4.86 | sulfolane | 285 | 240 | Soluble | Opaque solid gel |
| IPS42 | 5.14 | tetrahydronaphthalene (tetralin) | 207 | 141 | Almost soluble | |
| IPS42 | 5.14 | tetrahydronaphthalene (tetralin) | 207 | 190 | Soluble | Yellow clear liquid |
| IPS42 | 5.24 | Therminol 66 (Monsanto) | 340 | 225 | Partly soluble | |
| IPS42 | 5.24 | Therminol 66 (Monsanto) | 340 | 250 | Soluble | Yellow clear viscous fluid |
| IPS42 | 5.08 | Therminol 75 (Monsanto) | 385 | 200 | Soluble | Yellow rubbery elastic gel/solid |
| IPS42 | 5.08 | Therminol 75 (Monsanto) | 385 | 166 | Gelatinous | |
| IPS42 | 5.09 | xylene | 141 | 141 | Partly soluble | Hazy jelly |
| MIXTURE* | MIXTURE* | 1-cyclohexyl-2-pyrrolidinone | 301 | 275 | Soluble | Amber hazy moderately stiff gel |
| MIXTURE* | MIXTURE* | 1-cyclohexyl-2-pyrrolidinone | 301 | 259 | Almost soluble | |
| SYNDIO | 4.72 | 1,2,4-trichlorobenzene | 214 | 211 | Soluble | Cloudy soft gel |
| SYNDIO | 5.19 | 1-benzyl-2-pyrrolidinone | 420 | 211 | Soluble | Amber clear firm gel |
| SYNDIO | 4.86 | 1-chloronaphthalene | 250 | 211 | Soluble | Firm hazy gel |
| SYNDIO | 5.08 | 1-cyclohexyl-2-pyrrolidinone | 301 | 200 | Soluble | Amber soft gel |
| SYNDIO | 4.95 | 1-phenyl-2-pyrrolidinone | 345 | 200 | Soluble | Opaque hard solid |
| SYNDIO | 4.97 | 4-phenylphenol | 321 | 211 | Soluble | Opaque hard solid |
| SYNDIO | 25.12 | 4-phenylphenol | 321 | 221 | Soluble | Opaque solid |
| SYNDIO | 5.16 | benzil | 347 | 211 | Soluble | Yellow hard solid |
| SYNDIO | 5.02 | benzophenone | 305 | 200 | Soluble | Clear firm gel |
| SYNDIO | 4.70 | caprolactam (epsilon) | 271 | 211 | Soluble | Opaque hard solid |
| SYNDIO | 24.94 | caprolactam (epsilon) | 271 | 221 | Soluble | Opaque hard solid |
| SYNDIO | 5.29 | diphenyl ether | 259 | 211 | Soluble | Firm hazy gel |
| SYNDIO | 5.35 | diphenyl sulfone | 379 | 231 | Soluble | Opaque hard solid |
| SYNDIO | 5.08 | N,N-diphenylformamide | 337 | 200 | Soluble | Opaque hard solid |
| SYNDIO | 5.21 | o-dichlorobenzene | 180 | 171 | Soluble | Firm hazy gel |
| SYNDIO | 4.77 | sulfolane | 285 | 217 | Not soluble | |
| SYNDIO | 4.77 | sulfolane | 285 | 231 | Soluble | Liquid slush |
| SYNDIO2 | 5.09 | 1,2,3-trichlorobenzene | 218 | 150 | Soluble | White opaque hard solid |
| SYNDIO2 | 5.14 | 1,2,4-trichlorobenzene | 214 | 136 | Soluble | Cloudy stiff gel |
| SYNDIO2 | 5.58 | 1-benzyl-2-pyrrolidinone | 420 | 224 | Soluble | Amber hazy stiff gel |
| SYNDIO2 | 5.58 | 1-benzyl-2-pyrrolidinone | 420 | 200 | Partly soluble | |
| SYNDIO2 | 5.26 | 1-chloronaphthalene | 258 | 136 | Soluble | Hazy stiff gel |
| SYNDIO2 | 5.16 | 1-cyclohexyl-2-pyrrolidinone | 301 | 136 | Partly soluble | |
| SYNDIO2 | 5.16 | 1-cyclohexyl-2-pyrrolidinone | 301 | 150 | Soluble | Amber soft hazy gel |
| SYNDIO2 | 5.13 | 1-ethyl-2-pyrrolidinone | 296 | 161 | Soluble | Pale yellow opaque slush |
| SYNDIO2 | 5.15 | 1-methyl-2-pyrrolidinone | 202 | 136 | Soluble | Cloudy stiff gel |
| SYNDIO2 | 5.04 | 1-phenyl-2-pyrrolidinone | 345 | 200 | Soluble | Tan opaque hard solid |
| SYNDIO2 | 5.09 | 4-phenylphenol | 321 | 225 | Soluble | White opaque hard solid |
| SYNDIO2 | 5.09 | 4-phenylphenol | 321 | 200 | Almost soluble | |
| SYNDIO2 | 5.13 | acetophenone | 202 | 165 | Soluble | Cloudy gel above solid |
| SYNDIO2 | 5.13 | acetophenone | 202 | 150 | Almost soluble | |
| SYNDIO2 | 5.01 | anisole | 154 | 153 | Soluble | Cloudy stiff gel |
| SYNDIO2 | 5.04 | benzil | 347 | 200 | Soluble | Yellow opaque hard solid |
| SYNDIO2 | 5.04 | benzil | 347 | 150 | Partially soluble | |
| SYNDIO2 | 5.05 | benzophenone | 305 | 188 | Soluble | Clear stiff gel |
| SYNDIO2 | 5.05 | benzophenone | 305 | 165 | Partly soluble | |
| SYNDIO2 | 5.67 | benzyl alcohol | 205 | 190 | Almost soluble | |
| SYNDIO2 | 5.67 | benzyl alcohol | 205 | 204 | Soluble | White opaque soft gel |
| SYNDIO2 | 5.12 | butyl stearate | 343 | 273 | Soluble | White opaque fluid |
| SYNDIO2 | 5.12 | butyl stearate | 343 | 250 | Partly soluble | |
| SYNDIO2 | 5.09 | caprolactam (epsilon) | 271 | 200 | Soluble | Hard solid |
| SYNDIO2 | 5.10 | cyclohexanone | 155 | 150 | Soluble | Soft gel |
| SYNDIO2 | 5.20 | decahydronaphthalene (decalin) | 190 | 188 | Almost soluble | Moderately stiff slush |
| SYNDIO2 | 5.18 | dimethyl phthalate | 282 | 200 | Partly soluble | |
| SYNDIO2 | 5.18 | dimethyl phthalate | 282 | 224 | Soluble | White opaque slush |
| SYNDIO2 | 5.02 | diphenyl ether | 259 | 150 | Soluble | Clear stiff gel |
| SYNDIO2 | 5.02 | diphenyl ether | 259 | 136 | Partly soluble | |
| SYNDIO2 | 5.28 | diphenyl sulfone | 379 | 225 | Soluble | Pale tan hard solid |
| SYNDIO2 | 5.19 | ethyl benzoate | 212 | 165 | Almost soluble | |
| SYNDIO2 | 5.19 | ethyl benzoate | 212 | 188 | Soluble | Stiff pale yellow hazy gel |
| SYNDIO2 | 5.34 | HB-40 (Monsanto) | 325 | 151 | Partly soluble | |

TABLE I-continued

| POLYMER | CONC. WGT. % | ISOLVENT | APPROX. B.P., DEG. C. | TEMP. DEG. C. | SOLUBILITY | APPEARANCE AT ROOM TEMP. |
|---|---|---|---|---|---|---|
| SYNDIO2 | 5.34 | HB-40 (Monsanto) | 325 | 200 | Soluble | Slightly hazy pale yellow firm gel |
| SYNDIO2 | 5.13 | Mesitylene (1,3,5-trimethyl benzene) | 163 | 161 | Almost soluble | Stiff heterogeneous gel |
| SYNDIO2 | 4.97 | methyl benzoate | 199 | 150 | soluble | Cloudy stiff gel |
| SYNDIO2 | 5.04 | methyl laurate | 262 | 250 | Soluble | White opaque slush |
| SYNDIO2 | 5.04 | methyl laurate | 262 | 224 | Almost soluble | |
| SYNDIO2 | 4.96 | methyl myristate | 323 | 241 | Hazy & soluble?? | |
| SYNDIO2 | 4.96 | methyl myristate | 323 | 255 | Soluble | Opaque white slush |
| SYNDIO2 | 5.07 | methyl salicylate | 222 | 175 | Soluble | Cloudy stiff gel |
| SYNDIO2 | 5.07 | methyl salicylate | 222 | 150 | Not soluble | |
| SYNDIO2 | 5.06 | methyl stearate | 359 | 273 | Soluble | Opaque solid |
| SYNDIO2 | 5.06 | methyl stearate | 359 | 250 | Partly soluble | |
| SYNDIO2 | 5.13 | nitrobenzene | 211 | 151 | Soluble | Yellow cloudy firm gel |
| SYNDIO2 | 4.82 | N,N-dimethylacetamide | 165 | 165 | Not Soluble | White slush |
| SYNDIO2 | 5.04 | N,N-diphenylformamide | 337 | 225 | Soluble | Brown hard solid |
| SYNDIO2 | 5.04 | N,N-diphenylformamide | 337 | 200 | Almost soluble | |
| SYNDIO2 | 5.13 | o-dichlorobenzene | 180 | 150 | Soluble | Cloudy stiff gel |
| SYNDIO2 | 5.13 | o-dichlorobenzene | 180 | 136 | Partly soluble | |
| SYNDIO2 | 5.00 | Santowax R (Monsanto) | 364 | 166 | Partially soluble | |
| SYNDIO2 | 5.00 | Santowax R (Monsanto) | 364 | 200 | Soluble | Tan hard solid |
| SYNDIO2 | 5.00 | sulfolane | 285 | 200 | Not soluble | |
| SYNDIO2 | 5.00 | sulfolane | 285 | 249 | Soluble | Light tan opaque firm gel |
| SYNDIO2 | 5.00 | sulfolane | 285 | 225 | Partially soluble | |
| SYNDIO2 | 5.27 | tetrahydronaphthalene (tetralin) | 207 | 136 | Soluble | Stiff hazy gel |
| SYNDIO2 | 5.15 | Therminol 66 (Monsanto) | 340 | 200 | Soluble | Slightly hazy pale yellow soft gel |
| SYNDIO2 | 5.15 | Therminol 66 (Monsanto) | 340 | 151 | Partly soluble | |
| SYNDIO2 | 4.99 | Therminol 75 (Monsanto) | 385 | 200 | Soluble | Yellow opaque firm solid/gel |
| SYNDIO2 | 5.25 | xylene | 141 | 136 | Soluble | Moderately stiff white opaque gel |
| IPS42 | 5.01 | cyclohexylbenzene | 239 | 158 | Soluble | Water-clear liquid |
| IPS42 | 5.00 | dicyclohexyl | 227 | 181 | Almost soluble | |
| IPS42 | 5.00 | dicyclohexyl | 227 | 200 | Soluble | Clear liquid with ppt. |
| IPS42 | 4.99 | methyl caproate | 151 | 151 | Mostly dissolved | White opaque homogeneous slush |
| IPS42 | 4.99 | methyl caproate | 151 | 150 | Heavily swollen | |
| IPS42 | 4.99 | methyl caprylate | 194 | 151 | Not soluble | |
| IPS42 | 4.99 | methyl caprylate | 194 | 169 | Heavily swollen | |
| IPS42 | 4.99 | methyl caprylate | 194 | 183 | Mostly soluble | Opaque white homogeneous slush |
| IPS42 | 4.99 | methyl enanthate | 172 | 151 | Not soluble | |
| IPS42 | 4.99 | methyl enanthate | 172 | 172 | Mostly dissolved | Opaque white homogeneous slush |
| IPS42 | 4.99 | methyl valerate | 128 | 128 | Not soluble | Water-clear liquid with polymer sediment |
| IPS42 | 5.00 | n-butylbenzene | 183 | 151 | Mostly dissolved | |
| IPS42 | 5.00 | n-butylbenzene | 183 | 169 | Soluble | Water-clear liquid |
| IPS42 | 5.01 | n-propylbenzene | 159 | 158 | Soluble | Clear mod. viscous fluid |
| IPS42 | 5.01 | n-propylbenzene | 159 | 155 | Heavily swollen | |
| IPS42 | 4.98 | phenetole | 169 | 128 | Heavily swollen | |
| IPS42 | 4.98 | phenetole | 169 | 151 | Mostly dissolved | |
| IPS42 | 4.98 | phenetole | 169 | 169 | Soluble | Clear pink mod. viscous fluid |
| IPS42 | 5.08 | phenol | 182 | 155 | Swollen | |
| IPS42 | 5.08 | phenol | 182 | 158 | Soluble & viscous | Clear dark orange viscous fluid |
| SYNDIO2 | 4.98 | cyclohexylbenzene | 239 | 181 | Soluble | Cloudy firm gel |
| SYNDIO2 | 4.98 | cyclohexylbenzene | 239 | 158 | Almost Soluble | |
| SYNDIO2 | 4.99 | dicyclohexyl | 227 | 200 | Mostly soluble | |
| SYNDIO2 | 4.99 | dicyclohexyl | 227 | 225 | Soluble | Homogeneous slush |
| SYNDIO2 | 4.98 | methyl caproate | 151 | 151 | Not soluble | Clear liquid with solid polymer sediment |
| SYNDIO2 | 5.01 | methyl caprylate | 194 | 194 | Not soluble | Milky liquid with solid sediment |
| SYNDIO2 | 4.94 | methyl enanthate | 172 | 172 | Not soluble | Water-clear liquid with polymer sediment |
| SYNDIO2 | 4.99 | methyl valerate | 128 | 128 | Not soluble | Water-clear liquid with sediment |
| SYNDIO2 | 4.96 | n-butylbenzene | 182 | 183 | Mostly soluble | White opaque soft gel |
| SYNDIO2 | 4.96 | n-butylbenzene | 182 | 169 | Heavily swollen | |
| SYNDIO2 | 4.96 | n-butylbenzene | 182 | 151 | Not soluble | |
| SYNDIO2 | 5.00 | n-propylbenzene | 159 | 158 | Soluble | White opaque firm gel |
| SYNDIO2 | 5.04 | phenetole | 169 | 128 | Swollen | |
| SYNDIO2 | 5.04 | phenetole | 169 | 150 | Soluble | Hazy pink firm gel |
| SYNDIO2 | 5.35 | phenol | 182 | 155 | Swollen | |
| SYNDIO2 | 5.35 | phenol | 182 | 158 | Almost soluble | |

TABLE I-continued

| POLYMER | CONC. WGT. % | ISOLVENT | APPROX. B.P., DEG. C. | TEMP. DEG. C. | SOLUBILITY | APPEARANCE AT ROOM TEMP. |
|---------|--------------|----------|----------------------|---------------|------------|--------------------------|
| SYNDIO2 | 5.35 | phenol | 182 | 181 | Soluble | Opaque white firm gel |

*Mixture = SYNDIO2 (3.16%) + IPS42 (3.06%)

Examples 2–8 use syndiotactic polystyrene possessing a weight-average molecular weight of about $5.6 \times 10^5$ daltons. Examples 10–12 use syndiotactic polystyrene having a molecular weight in excess of about $3 \times 10^6$ daltons. The flat sheet membranes of Examples 2–12 are evaluated as follows. The membranes are dried in a vacuum oven at room temperature for at least 24 hours. The membranes are then placed in an Amicon test cell on top of a macroporous support disk. The effective membrane area is about 12.5 cm². The membrane is first checked for leaks by filling the cell with water, pressurizing the cell to about 5 psi, and measuring any decay in pressure once the pressure source is cut off. The water is then emptied from the cell and the membrane dried. The nitrogen flux through the dry membrane is then measured. The membrane is then wetted with isopropyl alcohol, followed by water. The water flux through the membrane is then measured. The membrane is then again wetted with alcohol prior to measuring the bubble point, mean pore size, and maximum pore size in accordance with ASTM F316-86.

EXAMPLE 2

A solution consisting of about 14.8% syndiotactic polystyrene, about 14.7% isotactic polystyrene, and about 70.5% o-dichlorobenzene is prepared by heating the mixture at about 176° C. for about 6 hours in a screw-cap enclosed vial with an aluminum foil liner. The syndiotactic polystyrene exhibits a weight-average molecular weight of about $5.6 \times 10^5$ daltons and a number-average molecular weight of about $2.56 \times 10^5$ daltons. The isotactic polystyrene exhibits a viscosity-average molecular weight in excess of about $2.6 \times 10^6$ daltons and contains about 9.4% atactic polystyrene (i.e. polymer extractable with hot methyl ethyl ketone). The vial is frequently inverted during the dissolution process to ensure homogeneity of the solution.

The hot solution is poured between glass plates on a hot plate at about 172° C.; slight pressure is applied to the top plate to ensure even spreading of the solution. The glass plates are quenched to room temperature. The film is peeled from the glass plates and soaked in excess 2-propanol at room temperature for about 3 hours. The film is dried under vacuum at room temperature for about 17–18 hours.

The porosity of the membrane is determined gravimetrically and found to be about 31.4%. The bubble point of the membrane is determined by ASTM F316-86 and found to be about 70.4 psi. The mean pore size is determined by ASTM F316-86 and found to be about 120 Angstroms. The maximum pore size is determined by ASTM F316-86 and found to be about 1300 Angstroms. The nitrogen flux is determined to be about $4.17 \times 10^{-3}$ cm³(STP)

$$\frac{cm^3 \text{ (STP)}}{cm^2 \text{ sec cm Hg}}$$

The water flux of the membrane is similarly measured and is determined to be about 12 GFD at 50 psi.

EXAMPLE 3

The solution of Example 2 is similarly cast between glass plates at about 160° C. The glass plates are quenched to room temperature. The film is removed from the glass plates and soaked in excess hexane at room temperature for about 3 hours. The film is dried under vacuum at room temperature overnight.

The membrane characteristics are determined in the manner described in Example 2. The membrane has a porosity of about 40.8%, a bubble point of about 122 psi, a mean pore size of about 700 Angstroms, and a maximum pore size of about 800 Angstroms. The nitrogen flux is about $$0.53 \times 10^{-3} \frac{cm^3 \text{ (STP)}}{cm^2 \text{ sec cm Hg}}$$

and the water flux is about 60 GFD at 50 psi.

EXAMPLE 4

A solution is prepared from a mixture of about 15.0% syndiotactic polystyrene, about 15.0% isotactic polystyrene and about 70.0% nitrobenzene. The syndiotactic polystyrene and isotactic polystyrene used are as described in Example 2. Dissolution and homogeneity of the solution is ensured by heating the mixture at about 200° C. for about 8 hours with repeated inversion of the vial containing the solution.

The hot solution is cast between glass plates at about 130° C. The plates are quenched to room temperature. The film is removed from the plates and soaked in ethanol for about 2 hours. The film is dried under vacuum at room temperature overnight.

The membrane characteristics are measured as described in Example 2. The membrane possesses a porosity of about 62.0%, a bubble point of about 125 psi, a mean pore size of about 90 Angstroms, and a maximum pore size of about 740 Angstroms. The nitrogen flux is about $$2.01 \times 10^{-3} \frac{cm^3 \text{ (STP)}}{cm^2 \text{ sec cm Hg}}$$

and the water flux is about 8.3 GFD at 50 psi.

EXAMPLE 5

A solution consisting of about 10.0% isotactic polystyrene, about 20.0% syndiotactic polystyrene, and about 70.0% o-dichlorobenzene is prepared in a manner similar to that described in Example 2. The film is cast between glass plates at about 176° C., the glass plates quenched to room temperature, the film extracted for about 1 hour at room temperature in isopropyl alcohol, and the film dried under vacuum at room temperature.

The membrane characteristics are determined in the manner described in Example 2. The membrane possesses a porosity of about 49.3%, a mean pore size of about 460 Angstroms, and a maximum pore size of about 500 Angstroms. The water flux is about 7.8 GFD at 50 psi.

EXAMPLE 6

A solution is prepared by heating about 20.0% isotactic polystyrene, about 10.0% syndiotactic polystyrene, and about 70.0% o-dichlorobenzene in the manner described in Example 2. A film is cast between glass plates at about 165° C., the glass plates quenched to room temperature, the film soaked in isopropyl alcohol for about 1 hour, and then the film dried under vacuum at room temperature.

The membrane characteristics are determined as described in Example 2. The membrane exhibits a porosity of about 48.5%, a mean pore size of about 570 Angstroms, and a maximum pore size of about 800 Angstroms. The water flux is about 152.8 GFD at 50 psi.

EXAMPLE 7

This example is for comparative purposes and is not meant to illustrate the invention.

The isotactic polystyrene of Example 2 is used to prepare a solution of about 30.0% isotactic polystyrene and about 70.0% o-dichlorobenzene by heating the mixture at about 176° C. for about 3.5 hours with repeated inversion of the vial containing the solution to ensure homogeneity.

Films are cast from the solution at about 157° C. and 145° C. by pouring the solution between heated glass plates. The films are quenched to room temperature and removed from the glass plates. The resulting films are very sticky, soft, and weak. The films are immersed in 2-propanol overnight at room temperature and subsequently dried under vacuum at room temperature over the weekend. The resulting films are cloudy, irregular, and very heterogeneous; they are deemed unsuitable for testing.

EXAMPLE 8

A film is prepared in a manner similar to Example 9 except from a solution of about 30.0% isotactic polystyrene and about 70.0% nitrobenzene. The resulting film is very non-uniform and irregular. It is deemed unsuitable for testing.

EXAMPLE 9

This example is for comparative purposes and is not meant to illustrate the invention.

A solution of about 30.0% atactic polystyrene (STYRON ® polystyrene, ®trademark of The Dow Chemical Company) and about 70.0% o-dichlorobenzene is prepared by heating the mixture at about 176° C. for about 6.5 hours with repeated inversion of the vial containing the solution to ensure homogeneity. A film could not be prepared from the moderately viscous solution because of lack of gel formation.

EXAMPLE 10

Syndiotactic polystyrene with a molecular weight in excess of $3 \times 10^6$ daltons and the isotactic polystyrene of Example 2 are used to prepare a solution at about 176° C. of about 15.0% isotactic polystyrene, about 15.0% syndiotactic polystyrene, and about 70.0% o-dichlorobenzene. The hot solution is cast between glass plates at about 155° C. which are quenched to room temperature. The film is extracted in room temperature 2-propanol and dried at room temperature under vacuum. The film became flawed during flux testing and no meaningful data could be obtained.

EXAMPLE 11

A solution from the polystyrenes of Example 12 is prepared in a similar manner from about 10.0% isotactic polystyrene, about 20.0% syndiotactic polystyrene, and about 70.0% o-dichlorobenzene. The hot solution is similarly cast, quenched, extracted, and dried as described in Example 12. The film became flawed during flux testing and no meaningful data could be obtained.

EXAMPLE 12

A solution consisting of about 20.0% of the isotactic polystyrene of Example 2, about 10.0% of syndiotactic polystyrene with a molecular weight in excess of $3 \times 10^6$ daltons, and about 70.0% o-dichlorobenzene is prepared at a temperature of about 176° C. in the manner described in Example 2. A film is cast between hot plates at about 155° C. and the glass plates quenched to room temperature. The film is removed from the glass plates, extracted with 2-propanol at room temperature for about 4.5 hours, and dried under vacuum at room temperature.

The membrane characteristics are measured as described in Example 2. The porosity is about 39.0%, the mean pore size about 490 Angstroms, and the maximum pore size about 520 Angstroms. The water flux is about 48.9 GFD at 50 psi.

The membrane characteristics of Examples 2–12 are summarized in Table II.

TABLE II

| Example | Ratio of IPS/S PS* | Porosity (%) | Bubble Point (psi) | Mean Pore Size (Angstroms) | Maximum Pore Size (Angstroms) | Nitrogen Flux $cm^3$ (STP) $cm^2$ sec Hg | Water Flux (GFD) |
|---|---|---|---|---|---|---|---|
| 2 | 1:1 | 31.4 | 70.4 | 120 | 1300 | $4.17 \times 10^{-3}$ | 12 |
| 3 | 1:1 | 40.8 | 122 | 700 | 800 | $0.53 \times 10^{-3}$ | 60 |
| 4 | 1:1 | 62.0 | 125 | 90 | 740 | $2.01 \times 10^{-3}$ | 8.3 |
| 5 | 1:2 | 49.3 | — | 460 | 500 | — | 7.8 |
| 6 | 2:1 | 48.5 | — | 570 | 800 | — | 152.8 |
| 7 | 1:0 | — | — | — | — | — | — |
| 8 | 1:0 | — | — | — | — | — | — |
| 9 | atactic ps | — | — | — | — | — | — |
| 10 | 1:1 | — | — | — | — | — | — |
| 11 | 1:1 | — | — | — | — | — | — |
| 12 | 2:1 | 39.0 | — | 490 | 520 | — | 48.9 |

*IPS = Isotactic polystyrene
SPS = Syndiotactic polystyrene

EXAMPLE 13

Hollow fibers are extruded on a RAM extruder from an extrusion blend containing about 15 percent isotactic polystyrene (Mw of about 72.6×10⁶ daltons), 15 percent syndiotactic polystyrene (Mw of about 8×10⁵ daltons), and about 70 percent o-dichlorobenzene by weight. The extrusion blend is heated to about 188° C. and forced through a single hole hollow fiber spinnerette using nitrogen as a core gas. Upon exiting the spinnerette, the hollow fibers are passed through about a 6 inch air gap prior to entering a bath of isopropyl alcohol for about 25 seconds. The fibers are taken up at about 170 centimeters/minute.

The fibers are then soaked in isopropyl alcohol for about 1 hour to remove o-dichlorobenzene and then dried in a vacuum oven at room temperature for about 6 days. The dried fibers possess an internal diameter of about 780 microns and a wall thickness of about 123 microns.

The fibers are fabricated into a straight fiber test cell possessing 4 fibers with an active length of about 5.5 centimeters. The gas flux through the fibers is evaluated by internally pressurizing the fibers with nitrogen at room temperature and about 86 psig and measuring the permeated nitrogen. The nitrogen flux through the fibers is determined to be about $$1.1 \times 10^{-9} \frac{cm^3 \ (STP)}{cm^2 \ sec \ cm \ Hg}.$$

EXAMPLE 14

The fibers fabricated in Example 13 are heated to about 50° C. for a few minutes to enable the fibers to be bent into a loop used for fabricating a loop fiber test cell containing 4 fibers with an active length of about 13.1 centimeters. The gas flux through the fibers is evaluated by internally pressurizing the fibers with nitrogen at room temperature and about 84 psig. The nitrogen flux through the fibers is determined to be about $$2.45 \times 10^{-7} \frac{cm^3 \ (STP)}{cm^2 \ sec \ cm \ Hg}.$$

EXAMPLE 15

Hollow fibers are fabricated as described in Example 13 except that the fibers are drawn at about 100° C. in a glycerol both to increase mechanical strength by inducing orientation and to increase gas flux. The fibers are soaked in glycerol at about 100° C. and then drawn about 100 percent. After drawing, the fibers are held under tension in the glycerol bath. The fibers shrink slightly after tension is removed, resulting in an effective draw of about 87 percent. The fibers are washed with water to remove glycerol. The drawn fiber possesses an internal diameter of about 449 microns and a wall thickness of about 80 microns.

The fibers are formed into two loop fiber test cells containing 8 fibers each with an active length of about 10.3 centimeters. The fibers are then washed with methanol and dried to remove any remaining traces of glycerol and/or water. The gas flux through the fibers is measured by internally pressurizing the fibers with nitrogen at room temperature and about 50 psig. The nitrogen flux through the fibers is determined to be about $$8.68 \times 10^{-7} \frac{cm^3 \ (STP)}{cm^2 \ sec \ cm \ Hg} \text{ and about } 8.82 \frac{cm^3 \ (STP)}{cm^2 \ sec \ cm \ Hg}$$

respectively for the two test cells.

What is claimed is:

1. A process comprising: preparing a semi-permeable isotropic or anisotropic microporous membrane having properties sufficient for maintaining structural integrity under conditions of ultrafiltration and/or microfiltration, by:
   A. forming a mixture comprising:
      (i) isotactic polystyrene and syndiotactic polystyrene, wherein the ratio of isotactic polystyrene to syndiotactic polystyrene is such that the membrane possesses sufficient structural integrity under conditions of operation, and
      (ii) at least one solvent for the polystyrenes;
   B. heating the mixture to a temperature under conditions such that a homogeneous fluid is formed which possesses sufficient viscosity to be formed into a membrane;
   C. extruding or casting the homogeneous fluid into a membrane;
   D. quenching or coagulating the membrane by passing the membrane through one or more zones under conditions such that the membrane solidifies; and
   E. simultaneously or consecutively leaching the membrane by passing the membrane through one or more zones under conditions such that at least a substantial portion of the solvent for the polystyrenes is removed from the membrane;

wherein the semi-permeable membrane so formed possesses isotropic or anisotropic microporous structure.

2. A process comprising preparing a semi-permeable isotropic or anisotropic microporous membrane having properties sufficient for maintaining structural integrity under conditions of ultrafiltration and/or microfiltration, by:
   A. forming a mixture comprising:
      (i) isotactic polystyrene and syndiotactic polystyrene, wherein the ratio of isotactic polystyrene to syndiotactic polystyrene is such that the membrane possesses sufficient structural integrity under conditions of operation, and
      (ii) at least one solvent for the polystyrenes;
      (iii) at least one non-solvent for the polystyrenes;
   B. heating the mixture to a temperature under conditions such that a homogeneous fluid is formed which possesses sufficient viscosity to be formed into a membrane;
   C. extruding or casting the homogeneous fluid into a membrane;
   D. quenching or coagulating the membrane by passing the membrane through one or more zones under conditions such that the membrane solidifies; and
   E. simultaneously or consecutively leaching the membrane by passing the membrane through one or more zones under conditions such that at least a substantial portion of the solvent for the polystyrene is removed from the membrane;

wherein the semi-permeable membrane so formed possesses isotropic or anisotropic microporous structure.

3. The process of claim 1 or 2 which further compromises:

F. heating the membrane before, during, and/or after leaching to a temperature at or above the ambient temperature and below the melting point of the polystyrenes or the depressed melting point of the mixture to elongate the membrane and to induce orientation of the polystyrenes in the membrane.

4. The process of claim 3 wherein the ratio of isotactic polystyrene to syndiotactic polystyrene is in the range of from about 0.05 to about 20.

5. The process of claim 4 wherein the amount of polystyrenes in the mixture is between about 5 and about 90 weight percent.

6. The process of claim 5 wherein the homogeneous fluid is extruded or cast at a temperature of between about 25° and about 325° C.

7. The process of claim 6 wherein the membrane is quenched by:
(i) passing the membrane through an air zone wherein the membrane begins to solidify; and
(ii) passing the membrane through one or more liquid zones comprising a liquid which is a solvent for the polystyrene solvent and non-solvent and which is not a solvent for the polystyrenes, wherein the membrane is solidified and a portion of the polystyrene solvent and non-solvent is removed.

8. The process of claim 7 wherein the temperature of the air quench zone is between about 0° and about 100° C.

9. The process of claim 8 wherein the temperature of the liquid quench zone(s) is between about 0° and about 100° C.

10. The process of claim 8 wherein the quench liquid is water, a lower alcohol, a halogenated hydrocarbon, or a perhalogenated carbon compound.

11. The process of claim 10 wherein the membrane is heated for drawing to a temperature of between about 10° and about 280° C.

12. The process of claim 11 wherein the membrane is drawn to an elongation ratio of between about 1.05 and about 10.

* * * * *

UNITED STATES PATENT AND TRADEMARK OFFICE
CERTIFICATE OF CORRECTION

PATENT NO. : 4,976,901
DATED : December 11, 1990
INVENTOR(S) : Henry N. Beck et al.

It is certified that error appears in the above-identified patent and that said Letters Patent is hereby corrected as shown below:

On the title page, under the heading "Other Publications" for the reference to Roots, J., Nystroem, B., and Higgins, J. S., *Polym.Commun.*, 26(8), 229-32 (1985), delete "229-32" and insert -- 229-31 --;

Col. 18, in Table I, under the subheading "Appearance At Room Temperature" for the solvent methyl valerate, delete "with sediment" and insert -- with solid sediment --;

Col. 19, line 61, after $4.17 \times 10^{-3}$, delete "$cm^3(STP)$".

Signed and Sealed this

Twenty-fifth Day of August, 1992

Attest:

DOUGLAS B. COMER

Attesting Officer     Acting Commissioner of Patents and Trademarks